(12) United States Patent
Ballard

(10) Patent No.: US 6,288,726 B1
(45) Date of Patent: Sep. 11, 2001

(54) METHOD FOR RENDERING GLYPHS USING A LAYOUT SERVICES LIBRARY

(75) Inventor: Dean D. Ballard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/884,115

(22) Filed: Jun. 27, 1997

(51) Int. Cl.[7] .................................................. G06T 15/00
(52) U.S. Cl. ............................................ 345/468; 345/470
(58) Field of Search ..................................... 345/433, 467, 345/468, 469, 144, 470, 471, 472

(56) References Cited

U.S. PATENT DOCUMENTS

| | | |
|---|---|---|
| 5,289,169 | 2/1994 | Corfield et al. . |
| 5,416,898 | 5/1995 | Opstad et al. . |
| 5,440,745 | 8/1995 | Platte et al. . |
| 5,537,131 * | 7/1996 | Mitsushashi et al. ............... 345/470 |
| 5,633,991 * | 5/1997 | Hakaridani et al. ................. 345/470 |
| 5,852,447 * | 12/1998 | Hosoya et al. ....................... 345/468 |
| 5,867,172 * | 2/1999 | Fujisawa et al. ..................... 345/468 |
| 5,936,637 * | 8/1999 | Seto ..................................... 345/468 |
| 5,940,084 * | 8/1999 | Motokado et al. ................... 345/468 |
| 5,959,635 * | 9/1999 | Watanabe et al. ................... 345/470 |
| 5,982,387 * | 11/1999 | Hellmann ............................ 345/468 |

FOREIGN PATENT DOCUMENTS 0 313 399   4/1989   (EP) .
0 575 164 A2   12/1993   (EP) .

OTHER PUBLICATIONS

"TrueType Open Font Specification," Mar. 1995 including Jul. 1995 revisions, pp. 6–170.

* cited by examiner

Primary Examiner—Phu K. Nguyen
Assistant Examiner—Cliff N. Vo
(74) Attorney, Agent, or Firm—Jones & Askew, LLP

(57) ABSTRACT

Rendering glyphs using a layout services library. A layout services library provides a set of text-processing functions for use by a client program. The text-processing functions access font information stored in the font tables insulating the client program from the details of the font table formats. The layout services library may be used to identify glyph variants and to position glyphs along a base line for a run of text. To identify glyph variants, the layout services library scans the run of text to identify the locations of characters having alternative glyph forms. The layout services library creates a list of feature parameter structures, each of which contains a count of the number of glyph alternates that apply for each identified character. The client program assembles a list of identical characters which have different parameters and presents a list of all glyph variants to the user who chooses one of the alternatives. To position glyphs, the layout services library assembles data that describes the advance of a virtual pen point from glyph to glyph along the base line, an X-placement value, and a Y-placement value. The X-placement value and the Y-placement value are used to position the glyph with respect to the virtual pen point on the base line.

23 Claims, 5 Drawing Sheets

METHOD FOR RENDERING GLYPHS USING A LAYOUT SERVICES LIBRARY

FIELD OF THE INVENTION

This invention relates in general to rendering glyphs for a run of text, and particularly to substituting glyph alternatives and positioning glyphs using a layout services library.

BACKGROUND OF THE INVENTION

Electronic documents have proliferated as computers have become common fixtures in offices, schools, and homes. In many instances, electronic documents have replaced paper documents. To facilitate the use of an electronic document as a replacement for a paper document, the text of an electronic document must be legible and linguistically accurate. The text of an electronic document is typically rendered using one or more fonts. Examples of fonts include Arial, Times New Roman, and Courier. A font is a particular style of typeface. A font designed for an electronic document is designed to increase the readability of the document when displayed on a pixel display device, such as a monitor or a printer. To render the text of an electronic document in a particular font, the text is represented on the display device by glyphs. A glyph is a representation of one or more characters. A single glyph may represent a single character such as the lower case letter "f" or a single glyph may represent a string of characters such as the ligature "fi". To render a document on a display device, the characters of the document are converted to glyphs, and the glyphs are displayed on the display device to create a run of text.

Typically, font information, including glyph information, is stored in memory as a set of font tables. For example, the OpenType Layout font standard promulgated by Microsoft Corporation, assignee of the present invention, includes five font tables for each OpenType Layout font: (1) a glyph substitution table, (2) a glyph position table, (3) a justification table, (4) a base line table, and (5) a glyph definition table. The OpenType Layout font tables support contextual mapping between characters and glyphs, including ligatures, positional forms, alternatives, and other substitutions. A font which implements the OpenType Layout standard may also include font tables which contain additional types of data, such as glyph outlines, metrics, bitmaps, mapping information, plus additional tables containing information for advanced typography.

A word processing program or other program (the client program or client) may use the information in the font tables to layout and render the text (glyphs) of an electronic document on a display device. In advanced typography, there may not be a one-to-one correlation between a text character and the glyph that represents that character on the display device. For example, in some fonts, the "&" character may have a number of different or alternative appearances when rendered as a glyph on a display device. Absent some mechanism to select the appropriate alternative glyph for a particular character, the client program is unable to take advantage of the full array of alternatives and possibilities presented by the font tables.

Another aspect of advanced typography relates to the positioning of glyphs when rendering a run of text. Complex glyph positioning becomes an issue in writing systems, such as Vietnamese, that use diacritical and other marks to modify the sound or meaning of characters. These writing systems require controlled placement of all marks in relation to one another for legibility and linguistic accuracy. Other writing systems require sophisticated glyph positioning for correct typographic composition. For instance, Urdu glyphs are calligraphic and connect to one another along a descending, diagonal text line that proceeds from right to left. To properly render Urdu, a text-processing client must modify both the horizontal (X) and the vertical (Y) positions of each glyph.

One glyph positioning standard for TrueType fonts uses only one value, advance, to specify a glyph's position for text layout. If glyphs are positioned with respect to a virtual "pen point" that moves along a base line of text, advance describes where to move the virtual pen point to position the next glyph. For horizontal text, advance corresponds to the advance width in the X direction. TrueType fonts specify advance only in the X direction for horizontal layout and only in the Y direction for vertical layout. For simple Latin text layout, this value (advance) may be adequate to position glyphs correctly. But, for texts that require more sophisticated layout, the glyph positioning must cover a richer range. Additionally, the only positioning adjustment defined in the TrueType positioning model is pair kerning, which modifies the horizontal spacing between two glyphs. A typical kerning table lists pairs of glyphs and specifies how much space a text-processing client should add or remove between the glyphs to properly display each pair. It does not provide specific information about how to adjust the glyphs in each pair, and cannot adjust contexts of more than two glyphs.

In order to utilize the glyph rendering possibilities presented by alternative forms and complex positioning, the client program must be able to access and manipulate the font tables and the information contained in those tables. Such manipulation and utilization by the client program requires a level of complexity that may not be available in many client programs. Common interfaces handling sophisticated glyph positioning do not currently exist because there are only a few fonts that contain the advanced layout information. Some client programs, such as the "WINDOWS 95 ME" and the "WINDOWS 95 FE" operating systems, use advanced layout information contained in some system fonts, but those programs do so by parsing and interpreting the font data themselves. Therefore, many of the advanced typography features, such as alternative forms and complex glyph positioning, while available in the font tables, have not been utilized by the client programs that cannot handle such levels of complexity.

Another glyph positioning standard, known as TrueType Open, supplies more control and flexibility for positioning glyphs by using placement values for both the X-direction and the Y-direction. The X-placement value and the Y-placement value are stored in a subtable, known as the pair adjustment positioning table ("PairPos") within the glyph position table. By using both the X-placement value and the Y-placement value, the client program can independently adjust each glyph in a pair either independently or in relation to one another, thereby offering more flexibility and precise control over glyph positioning. Additionally, for each glyph, the PairPos table explicitly describes the type, size, and direction of the adjustment. For example, to kern two glyphs horizontally, the subtable might include direction to reduce the total advance units of the first glyph by 20 units in the X direction, reduce the left side bearing of the second glyph by 20 units, or to do both by 10 units instead of 20. Although the PairPos subtable offers greater control over glyph placement, the PairPos subtable is still stored in the front table, and therefore is not fully utilized due to the client programs being unable to take advantage of the full array of possibilities presented by the font tables.

Accordingly, there is a need in the art for a more efficient method for rendering alternative glyph forms and positioning glyphs in a run of text.

SUMMARY OF THE INVENTION

The present invention meets the needs described above by providing a method for identifying alternative glyph forms for the user of the client program so that the user can select the appropriate glyph form for his or her needs. The present invention also provides a method for positioning the glyphs in a run of text with respect to a base line.

In order to provide the advanced capabilities of selecting alternative glyph forms and complex glyph positioning, the method of the present invention employs a layout services library (server process or server) which provides a set of text processing functions for use by a word processing program or other client program. The layout services library includes font information functions, text layout functions, and text information functions. The font information functions provide information about the font. The text layout functions provide fundamental layout services including glyph substitution, glyph positioning, and justification. The layout services library is functionally situated between the client program and the operating system and communicates with the font tables. The layout services library serves the client program by accessing font information and guiding the operating system in rendering text (glyphs). The layout services library simplifies the job of text processing by insulating the client from the details of the font file format and from the details of the operating system operation. Particularly, the layout services library allows clients to work at the level of characters and features (for example, a superscript feature), with which clients are already familiar.

To select an alternative glyph form, the client program defines a text run and instructs the layout services library (server) to scan the text run and identify characters that have alternative glyph forms. In response, the layout services library returns a list of feature parameter structures, each of which contains a count of the number of glyph alternates that apply for each identified character. The client program uses this information to assemble a list of identical characters, each with a different parameter. The client program then calls the layout services library to get a list of all glyph alternatives (variants). The client program takes the list of glyph alternatives and presents the list to the user of the client program. After the user chooses an alternative glyph, the client program marks the character in the text run with a feature description and tags it with a parameter identifying which glyph alternative the user has chosen.

To position a glyph, the client program calls the layout services library (server) for glyph position information for each character in a run of text. The layout services library returns information for positioning the glyphs along a base line for the run of text. Particularly, the layout services library returns a value for advance of a virtual pen point along the base line, an X-placement value of the glyph from the virtual pen point, and a Y-placement value of the glyph from the virtual pen point. From the advance, X, and Y information, the operating system can render the glyph in the correct position in the rendered run of text.

The client also keeps track of the number glyphs which are positioned using positioning information from the layout services library. From that count, the client program can decide whether to continue using the layout services library for glyph positioning or whether to bypass the layout services library and render the glyphs based on default positioning information in the display device. Particularly, the client generates a list which contains a flag for each glyph in a run of text indicating whether the glyph has been positioned by the layout services library. If a predetermined number of consecutive glyphs have not been positioned by the layout services library, and if these glyphs exist in the printing device with default positioning information already defined, a printing client may choose to download glyphs to the printing device without positioning information from the layout services library. Such a method may save time in downloading a run of text to a printing device.

DETAILED DESCRIPTION

The present invention is directed toward a method for rendering glyphs for a run of text using a layout services library to identify glyph variants and to position glyphs along a base line for the run of text. Particularly, the present invention is directed toward a method for identifying alternative glyph forms for a user and rendering a selected glyph form when rendering a text run using a layout services library. The present invention is also directed toward a method for positioning glyphs when rendering a text run using a layout services library. In one embodiment, the invention may be incorporated into an operating system such as the "WINDOWS" operating system marketed by Microsoft Corporation of Redmond, Washington. In other embodiments, the invention may be incorporated into an Internet browser such as the "INTERNET EXPLORER" browser or a publishing program such as the "PUBLISHER" program, both marketed by Microsoft Corporation.

Briefly described, the method for identifying alternative glyph forms for a user includes the client program identifying a run of text to be rendered. For the identified run of text, the client program instructs the layout services library to scan the run of text to identify locations of characters for which there are alternative glyph forms. The layout services library returns a list of feature parameter structures identifying those character positions for which alternative glyphs are available. From that information, the client assembles a list of identical characters which have different parameters. The client then retrieves, via the layout services library, a list of all glyph alternatives or variants. The client program then presents that list of alternatives to the user who chooses one of the alternatives. The client program then marks the character in the text run with the feature description and tags it with a parameter identifying which glyph form the user has chosen.

With respect to glyph positioning, the client program identifies a run of text for rendering. The client program then calls the layout services library which in turn returns data that describes the advance of a virtual pen point from glyph to glyph along the base line, an X-placement value, and a Y-placement value. The X-placement value and the Y-placement value are used to position the glyph with respect to the virtual pen point on the base line.

By using the layout services library, the client program is insulated from the details of the font files and the rendering capabilities of the operating system.

Exemplary Operating Environment

Figure 1:
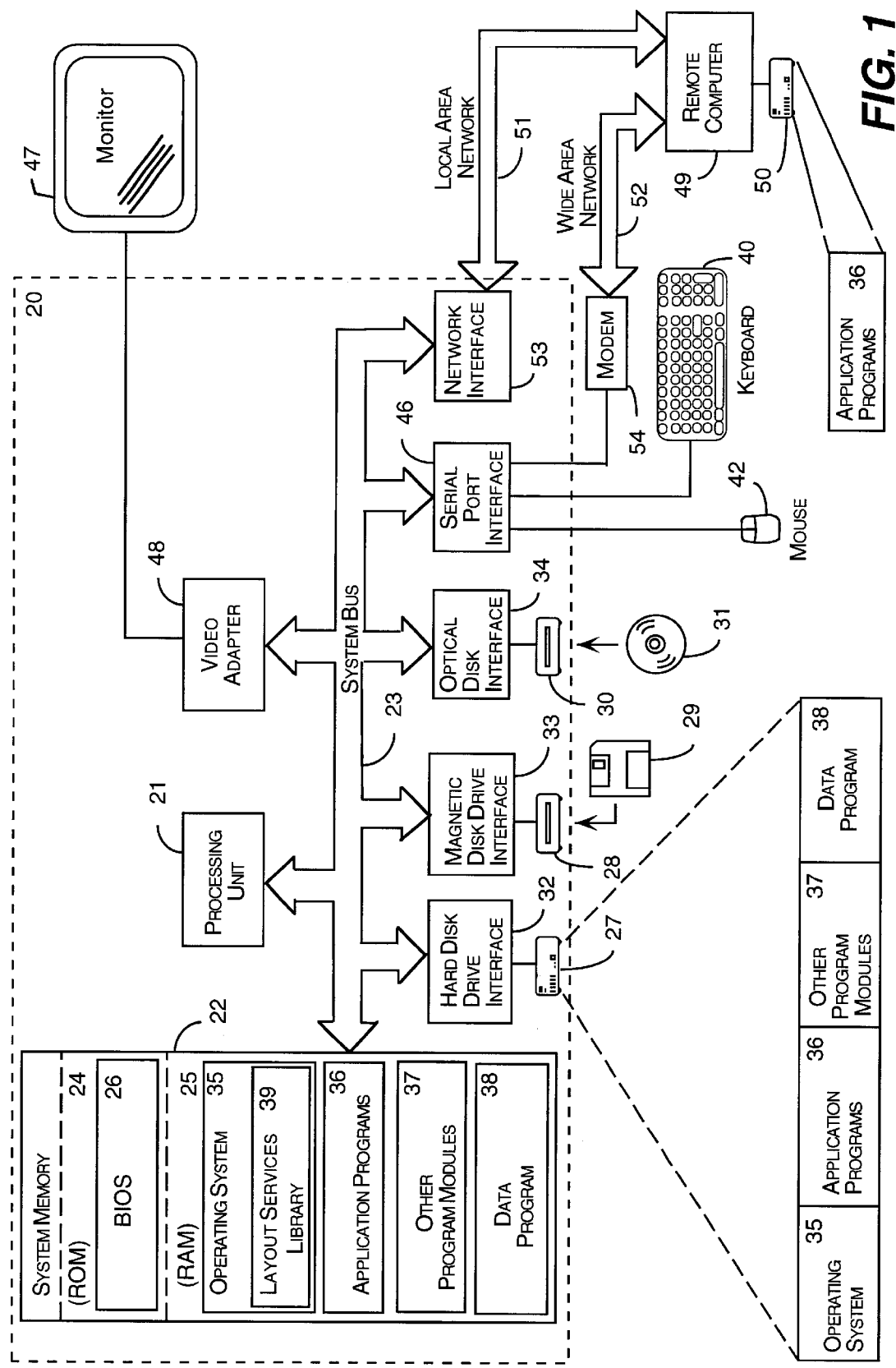
FIG. 1 is a block diagram of a personal computer illustrating the operating environment for an embodiment of the present invention.

FIG. 1 and the following discussion are intended to provide a brief, general description of a suitable computing environment in which the invention may be implemented. While the invention will be described in the general context of an application program (client program) that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, program data 38 and a layout services library 39. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Layout Services Library Embodiment

One embodiment of the present invention may be used by a word processing program to render a run of text on a display device using a layout services library and is referred to herein as the layout services library embodiment. Other embodiments of the present invention may be used in other text processing programs such as a publishing program or a browser.

The layout services library embodiment may be used with a number of fonts that conform to the OpenType Layout font standard. Font files, conforming to the OpenType Layout font standard, define glyphs, scripts, language systems, and features. A glyph is a representation of one or more characters. For example, a single glyph may represent a single character such as the lower case letter "f" or a single glyph may represent a string of characters such as the lower case letters "fi". A script is a group of related characters which may be used by one or more languages. Latin, Arabic, and Thai are examples of scripts. A script may be divided into language systems. For example, the Latin script is used in the English, French, and German language systems. Each language system may have different requirements for text processing. A language system may also support a number of features. A feature is a function provided by the font. The OpenType Layout font standard supports a number of features, including a swash feature and a ligature feature. The swash feature replaces a default glyph with an alternative glyph, and the ligature feature replaces a string of glyphs with a ligature glyph.

The OpenType Layout font standard defines five font tables, (1) a glyph substitution table, (2) a glyph position table, (3) a justification table, (4) a base line table, and (5) a glyph definition table. The font tables include information to support the features of the font. For example, the glyph substitution table includes information for glyph substitutions to support single glyph substitution, one-to-many substitution (ligature decomposition), aesthetic alternatives substitution, multiple glyph substitution (ligatures), and contextual glyph substitution. The glyph position table includes information for positioning glyphs by providing an advance value, an X-placement value, and a Y-placement value. The glyph positioning information supports a single adjustment (for example, to support a superscript or subscript), a pair adjustment (for example, to support kerning), a cursive attachment (for example, to support cursive scripts), a MarkToBase attachment (for example, to support positioning vowels, diacritical marks, or tone marks in Arabic, Hebrew and Vietnamese), a MarkToLigature attachment (for example, to support positioning vowels around ligatures), a MarkToMark attachment (for example, to support positioning tone marks with respect to vowel diacritical marks in Vietnamese), and contextual positioning (for example, to support positioning one or more glyphs in context). The base line table provides information to align lines of text. The justification table provides information to justify text. The glyph definition table provides information on classes of glyphs, attachment points, and ligature carets.

A word processing program utilizes the functions provided by the layout services library to layout text. The layout services library accesses the font tables and provides text layout suggestions to the word processing program. The word processing program may implement some, all, or none of the suggestions received from the layout services library. The word processing program accesses the layout services library by issuing function calls to the library. Typically, the word processing program defines a text run which is associated with a function call. A text run is a piece of text using a particular font at a particular size in a particular script and a particular language system. The word processing program may also define additional parameters for a function. For example, to invoke the glyph positioning function, the word processing client defines a text run. In response to the function call for glyph positioning, the layout services library returns the advance value, the X-placement value, and the Y-placement value for each glyph in the run of text. The data is typically stored in a data structure defined by the layout services library. The word processing program may use the values returned to position glyphs both horizontally and vertically. The function calls and the data structures used to support the alternative glyph method and the glyph positioning method are discussed in more detail in the section entitled "Layout Services Library Interface".

Layout Services Library System Architecture

Figure 2:
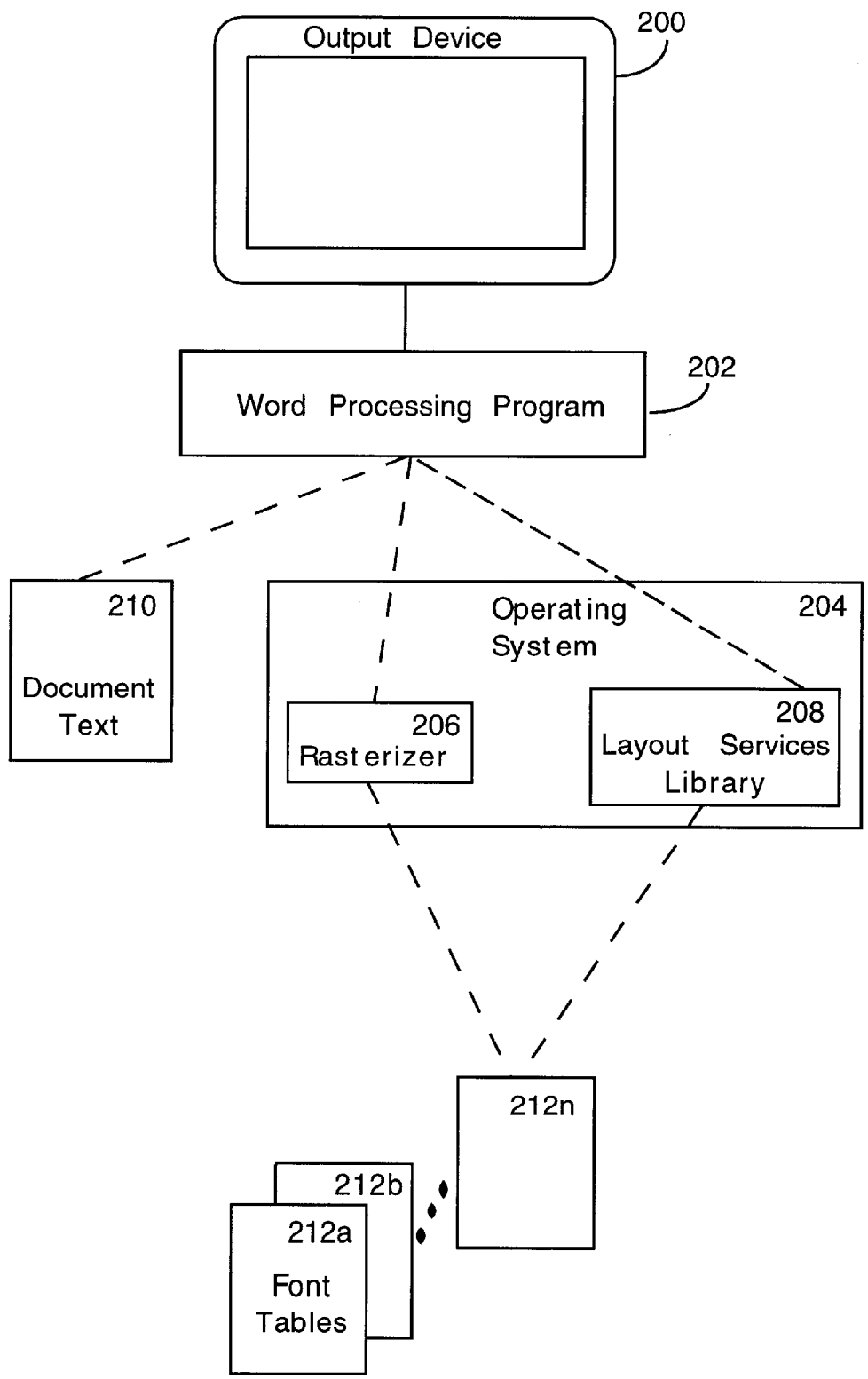
FIG. 2 is a block diagram illustrating the architecture of a computer system for an embodiment of the present invention.

The architecture for a system which implements the layout services library embodiment of the present invention is illustrated in FIG. 2. A word processing program (client program) 202 processes text from a document text file 210 for display on a display device, such as a monitor 200, a printer, or other pixel display. The document text is rendered on the display device 200 using the text processing functions provided by the layout services library 208. The word processing program 202 is a client of the services provided by the layout services library 208. Although the layout services library 208 is shown as part of the operating system 204 in FIG. 2, the layout services library 208 may also be a dynamically linked library positioned between the word processing program 202 and the operating system 204. The layout services library 208 interfaces with one or more sets of font tables 212a, 212b . . . 212n. The layout services library 208 uses the information stored in the font tables 212, 212b . . . 212n to provide the word processing program 202 with layout information and layout suggestions. The word processing program 202 interfaces with the layout services library 208 via a set of application program interfaces ("API's").

The API's contained in the layout services library support the glyph rendering method of the present invention including the alternate glyph identification method and the glyph positioning method. The layout services library accesses the font tables and guides the word processing program in identifying and selecting the alternative glyph form and positioning the glyphs in a run of text.

To display the text file on the display device 200, the word processing program 202 uses a rastorizer 206. Typically, the rastorizer 206 is located within the operating system 204. The rastorizer 206 obtains information from the font tables 212 to render the text on the output device 200.

Text Rendering Method

Figure 3:
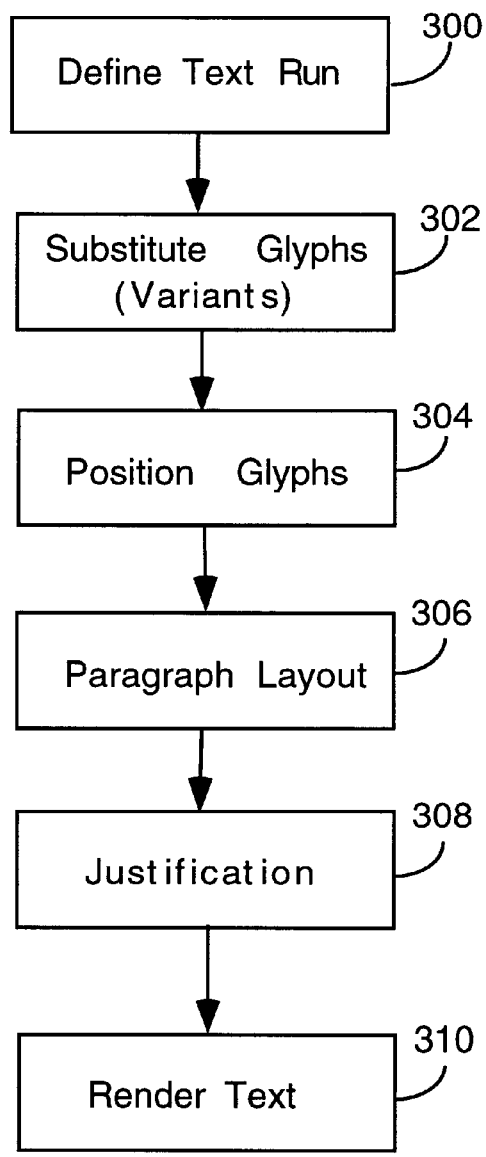
FIG. 3 is a flow diagram illustrating the steps generally used for laying out a run of text in accordance with an embodiment of the present invention.

The steps for rendering a run of text using a layout services library are shown in FIG. 3. In step 300, the word processing program defines a run of text for rendering. The text run is then rendered in steps 302–310. In step 302, the word processing client issues a substitute glyph function call to the layout services library. In response, the layout services library accesses the font tables to determine which glyphs should be substituted for which characters. A list of glyphs modified by the substitute glyph function call is returned by the layout services library. The substitute glyph function call provides for substitute glyph forms in a variety of circumstances where a one-to-one mapping between the character and the rendered glyph does not exist. A substitute glyph may be required where the glyph form of a character changes based on the context. For example, the character "g" in Arabic has four glyph forms depending on whether it occurs alone, at the beginning of a word, in the middle of a word, or at the end of a word. The substitute glyph step 302 also provides for substitution of a ligature glyph for two or more glyphs in a run of text. In addition, the substitute glyph step 302 provides for identification and rendering of alternative forms of a glyph based upon user selection in accordance with the present invention as described in greater detail in the section entitled "Identification Of Glyph Variants".

Once the glyphs are substituted, including substitution of selected glyph variants, the word processing program issues a position glyphs function call in step 304. The layout services library accesses the glyph position table to determine the glyph position information for the run of text. For each glyph in the run of text, the layout services library returns glyph position information including the advance value of a virtual pen point along a base line, the X-placement value, and the Y-placement value. The position glyph step 304 of the present invention will be described in greater detail in the section entitled "Positioning Of Glyphs".

Once the glyphs have been positioned along the base line, the rendering process proceeds to paragraph layout in step 306. Paragraph layout is accomplished by comparing the length of the run of text to a predetermined line length. To determine the length of the run of text, the word processing program issues a calculate length function call to the layout services library. In response, the layout services library converts the glyph positions of the run of text to character positions and calculates the length of the run of text. The layout services library returns a start position and an end position to the word processing program. The start position describes the left or top of the first character, and the end position describes the right or bottom of the last character for a right-to-left layout direction. The word processing program compares the start and end positions to the line length to determine whether the run of text exceeds the line length. If the length of the run of text is less than or equal to the line length, then the paragraph layout is complete.

If the run of text is greater than the line length, then the word processing program issues a character identification function call to the layout services library to request the identification of the character located at the end of the line. The layout services library determines the identity of the character at the end of the line. If the character at the end of the line is a space, the run of text is divided. The run of text is divided into a parent text run and a child text run. The run of text is divided at the space character so that the parent text run includes the text which does not exceed the line length and the child text run includes the remainder of the run of text.

If the character at the end of the line is not a space character, then the word processing program backs up the run of text and requests the identification of the character at the previous character location. The word processing program continues to back up the run of text until a space character is found. Once a space character is found, then the run of text is divided, and the process continues until all of the run of text has been laid out.

Once paragraph layout is complete, the rendering process moves to the justification step 308 if justification is enabled. To accomplish justification, the word processing program justifies the run of text on a line by line basis. Once the run of text is divided into a parent text run and a child text run in the paragraph layout step 306, the parent text run is justified using the parent text run as the line for justification. Once the line is defined, a determination is made whether the length of the line is equal to the line length. If the length of the line is equal to the line length, then justification is complete. If the length of the line is not equal to the line length, then the word processing program selects a justification priority scheme. The justification priority scheme indicates the severity of the modifications allowed to justify the line. For example, a first justification priority may include the mildest type of adjustment to satisfy the justification priority, such as word spacing adjustments. Subsequent justification priorities would allow more severe techniques to achieve justification, such as resubstituting or repositioning glyphs.

Once the word processing program selects the justification priority, the word processing program issues a justification information function call to the layout services library. The justification information function call requests confirmation that the requested justification priority is supported by the font. The layout services library accesses the font tables to determine whether the justification priority is supported, and if the justification priority is supported, whether glyph substitution and/or glyph positioning is required. The word processing program receives the layout services library's response to the justification information function call. If the response indicates that the requested justification priority is supported, then the method of step 308 continues to justify the lines of text. If the response indicates that the requested justification priority is not supported, then a justification error occurs. Paragraph layout and justification is described in more detail in the concurrently filed and commonly assigned U.S. patent application Ser. No. for a Method for Laying Out a Paragraph Using a Layout Services Library (Attorney Docket No. 13237-1755).

Figure 4:
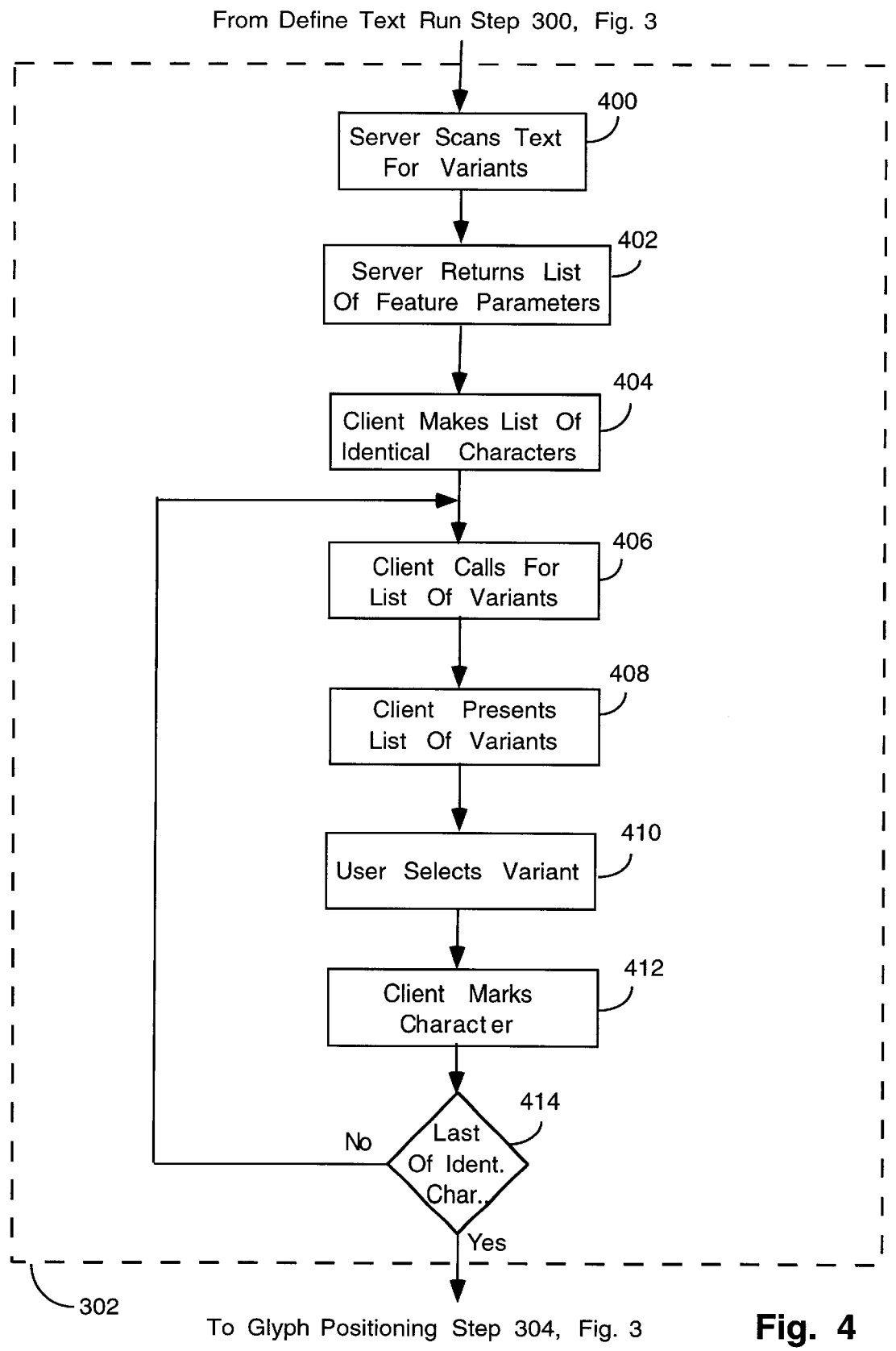
FIG. 4 is a flow diagram illustrating the steps for identifying alternative glyph forms for a user and rendering a selected glyph form when rendering a text run in accordance with an embodiment of the present invention.

At step 310 the word processing program 202 using the information supplied by the layout services library 208 instructs the operating system 204 to render the glyphs on the display device 200. ps Identification of Glyph Variants Turning to FIG. 4, the alternative glyph selection process of the substitute glyph step 302 of FIG. 3 is shown in greater detail. The alternative glyph selection process of the substitute glyph step 302 precedes after the word processor 202 has defined a run of text in step 300 (FIG. 3). The word processor calls the GetOtlFeatureParams function. In response to the GetOtlFeatureParams call, the layout services library at step 400 scans the run of text and identifies the locations of characters for which there are alternative glyphs. The server at step 402 then returns an otlList of feature parameter structures, each of which contains a count of the number of glyph alternatives that apply to that character position. An otlList is a data structure defined by the layout services library which is used to represent a number of different lists of data, such as characters, glyphs, attributes, and coordinates. At step 404, the client uses the information returned from the layout services library to assemble a list of identical characters, each with a different parameter.

At step 406, the word processor calls the SubstituteOtlGlyphs function to get a list of glyph variants. At step 408, the word processor presents the list of glyph variants to the user of the word processing program, who, at step 410, chooses a glyph variant for rendering. At step 412, the word processor marks the character in the run of text with a feature description and tags the character with a parameter identifying which glyph variant the user has chosen so that for each subsequent encounter of that character, the character is rendered using the same glyph variant.

At step 414, the word processor determines whether the marked character (step 412) was the last character in the list generated at step 404. If the character just processed is not the last character, the method follows the "no" branch back to step 406 for identification and selection of the variant for the next character from the list constructed at step 404. If the character is the last of the identical characters from step 404, the process follows the "yes" branch to the glyph positioning step 304 (FIG. 3).

Positioning of Glyphs

Turning to FIG. 3, the process of glyph substitution in step 302 continues to the position glyphs step at 304. The position glyph step at 304 is described in greater detail in connection with FIG. 5.

The word processor, upon entering step 304, first determines at step 512 the number of consecutive glyphs previously positioned without using information from the layout services library. If the number of consecutive glyphs positioned without using the layout services library is greater than a predetermined number N, the method follows the "yes" branch to step 514. At step 514, the word processor determines whether default position information is available in the display device. If default position information is available in the display device, the process follows the "yes" branch from step 514 and the position glyphs method of step 304 ends.

If the word processor determines at either step 512 or 514, that the number of consecutive glyphs positioned without using information from the services layout library has not exceeded a predetermined number N or if no default positioning information exists, the process follows the "no" branches from either step 512 or 514 to step 516.

At step 516 the client issues a call to the layout services library for positioning information. At step 518, the layout services library returns the advance value for a virtual pinpoint along a base line laid out by the word processor. In addition, the layout services library returns the X-placement value for the glyph and returns the Y-placement value for the glyph. The word processor having received the advance value, X-placement value, and Y-placement value for the glyph, then is able to render the glyph in the proper position along the previously established base line using the resources of the operating system 204 (FIG. 2).

Layout Services Library Interface

The layout services library provides a set of text-processing functions for use by a word processing client. The text-processing functions access font information stored in the font tables insulating the word processing client from the details of the font table formats. The layout services library typically includes font information functions, text layout functions, and text information functions. The font information functions return information about the font, such as the supported scripts, language systems, and features supported by the font. The text layout functions provide fundamental layout services including glyph substitution, glyph positioning, and justification. The text information functions return information about the text within a given text run. A word processing program invokes the text processing functions provided by the layout services library via function calls. The layout services library returns information to the word processing program via a data structure, such as an otlList data structure.

Figure 5:
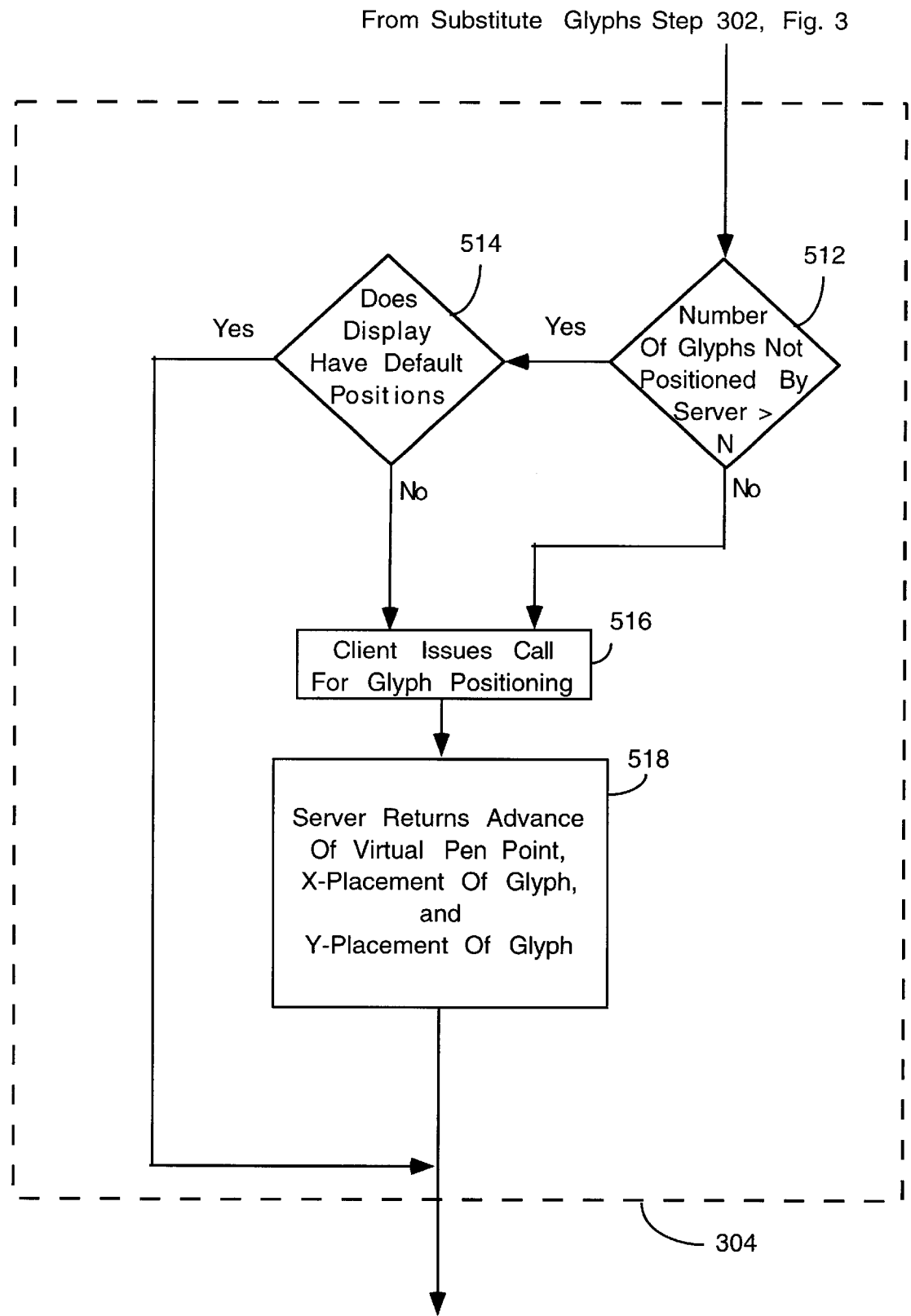
FIG. 5 is a flow diagram illustrating the steps for positioning glyphs when rendering a text run in accordance with an embodiment of the present invention.

In particular, the layout services library supports the glyph rendering method described in connection with FIGS. 3, 4 and 5. The text information function, GetOtlFeatureParams, supports the glyph variant identification method. The GetOtlFeatureParams function finds glyph variants or feature parameters within a run of text and returns a result, ptlParams, which is a list of feature parameters at the character level. From that list, the client program can request and construct a list of glyph variants for each character in the run of text having variants.

The text layout function, PositionOtlGlyphs, supports the glyph positioning method. The PositionOtlGlyphs function returns the results ptlDAdv, ptlDX, and ptlDY for the advance value of the virtual pen point, the X-placement value, and the Y-placement value for the glyph to be rendered. The use of both X-placement and Y-placement values as well as advance values allows the word processor support texts which require sophisticated layout. The glyph positioning method also uses data returned from the PositionalOtlGlyphs function to determine how many consecutive glyphs have been positioned using the layout services library for the run of text.

In summary, the present invention is directed toward a method for rendering glyphs for a run of text using a layout services library to identify glyph variants and to position glyphs along a base line for the run of text. The layout services library provides a set of text processing functions to support the glyph rendering method. In one embodiment, the layout services library includes font information functions, text layout functions, and text information functions. Additional functions may be provided as will be apparent to those skilled in the art. Although the present invention has been described using fonts conforming to the OpenType Layout font standard, the invention may be applied to other font standards and fonts.

Alternative embodiments will become apparent to those skilled in the art to which the present invention pertains without departing from its spirit and scope. Accordingly, the scope of the present invention is described by the appended claims and is supported by the foregoing description.

What is claimed is:

1. A method for identifying alternate glyph forms in a run of text for a user and rendering a selected glyph form, comprising the steps of:

a. scanning the run of text for characters which have alternate glyph forms;
   b. constructing a list of characters that have alternative glyph forms;
   c. presenting the user with a list of alternative glyph forms for each identified character in the run of text; and
   d. in response to a user selection, marking each identified character with the identity of the alternative glyph form selected by the user.

2. The method of claim 1, wherein the step of constructing a list of characters that have alternative glyph forms comprises using a layout services library to access a glyph substitution font table to identify characters which have alternative glyph forms.

3. The method of claim 1, wherein the step of presenting the user with a list of alternative glyph forms comprises using a layout services library to access a glyph substitution font table to obtain alternative glyph forms for each identified character.

4. A computer-readable medium having computer-executable instructions for identifying alternate glyph forms in a run of text for a user comprising:

a. scanning the run of text for characters which have alternate glyph forms;
   b. constructing a list of characters that have alternative glyph forms;
   c. presenting the user with a list of alternative glyph forms for each identified character in the run of text; and
   d. in response to a user selection, marking each identified character with the identity of the alternative glyph form selected by the user.

5. A computer-readable medium having computer-executable instructions for identifying alternate glyph forms in a run of text comprising:

a. receiving the run of text;
   b. scanning the run of text for characters which have alternate glyph forms;
   b. constructing a list of character locations corresponding to the characters which have alternative glyph forms; and
   c. constructing a list of alternative glyph forms for each identified character in the run of text.

6. A method of communication between a client process and a server process, comprising the steps of:

a. selecting a run of text by the client process;
   b. issuing a call by the client process to the server process to scan the run of text for characters which have alternate glyph forms;
   c. issuing a call by the client process to the server process for a list of feature parameter structures for each identified character having an alternative glyph form wherein the server process returns the list of feature parameter structures to the server process;
   d. in response to the list of feature parameter structures from the server process, the client process constructs a list of characters that have alternative glyph forms;
   e. presenting the user with a list of alternative glyph forms for each identified character in the run of text; and
   f. in response to a user selection, the client process marks each identified character with the identity of the alternative glyph form selected by the user.

7. A method of communication between a client process and a server process, comprising the steps of:

a. selecting a run of text by the client process;
   b. constructing a list of characters that have alternate glyph forms by:
      issuing a call to the server process by the client process to identify characters that have alternate glyph forms; and issuing a call to the server process by the client process to obtain alternate glyph forms for each identified character; and c. presenting the user with the list of alternate glyph forms for each identified character.

8. The method of claim 7, comprising:

in response to the client process issuing a call to the server process to identify characters, the server process selects a character from the run of text and accesses a glyph substitution font table to determine whether the selected character has alternate glyph forms.

9. The method of claim 7, comprising:

in response to the client process issuing a call to the server process to obtain alternate glyph forms for each identified character, the server process selects a character from the run of text and accesses a glyph substitution font table to determine whether alternate glyph forms for the selected character.

10. The method of claim 7, further comprising:

in response to a user selection, marking the character with the identity of the alternative glyph form selected by the user by the client process.

11. A method for positioning a glyph in a run of text comprising the steps of:

a. establishing a base line for the run of text;

b. advancing a virtual pen point along the base line to a glyph position;

c. at the position of the virtual pen point adjusting an X-placement of the glyph; and d. at the position of the virtual pen point adjusting a Y-placement of the glyph.

12. The method of claim 11, wherein the X-placement of the glyph and the Y-placement of the glyph are obtained by a layout services library from a glyph position font table.

13. A computer-readable medium having computer-executable instructions for positioning a glyph in a run of text comprising:

a. establishing a base line for the run of text;

b. advancing a virtual pen point along the base line to a glyph position;

c. at the position of the virtual pen point adjusting the X-placement of the glyph; and d. at the position of the virtual pen point adjusting the Y-placement of the glyph.

14. A method of communication between a client process and a server process for positioning a glyph in a run of text, comprising the steps of:

a. selecting the run of text by the client process;

b. issuing a call from the client process to the server process for the server process to establish a base line for the run of text and to position glyphs for the run of text along that base line;

c. in response to the call, the server process returns values from which the client process can:

1. advance a virtual pen point along the base line to a glyph position;

2. at the position of the virtual pen point, adjust an X-placement of the glyph; and 3. at the position of the virtual pen point, adjust a Y-placement of the glyph.

15. The method of claim 14, wherein the server process accesses a glyph position font table to return values for the X-placement of the glyph and the Y-placement of the glyph.

16. The method of claim 14, further comprising:

determining a default number corresponding to a number of consecutive glyphs positioned using default positioning information by the client process;

if the default number exceeds a predetermined number, then using the default positioning information to position the glyph by the client process.

17. A method of communication between a client process and a server process for rendering glyphs for a run of text, comprising the steps of:

a. selecting the run of text by the client process;

b. issuing a call from the client process to the server process for information regarding the parameters associated with each glyph in the run of text, including glyph variant information and glyph positioning information;

c. in response to the call, the server process returns values from which the client process can identify and render the appropriate glyph variant and position the rendered glyph.

18. A method of communication between a client process and a server process, comprising the steps of:

a. selecting a run of text by the client process;

b. issuing a layout services function call by the client process;

c. in response to the layout services function call, accessing a font table to obtain layout information for the run of text by the server process;

d. filling a data structure with the layout information by the server process; and e. accessing the data structure by the client process.

19. The method of claim 18, further comprising the step of:

using the layout information in the data structure to layout the run of text on a display device by the client process.

20. The method of claim 18, comprising the steps of:

if the layout services function call is a position glyphs function call, then accessing a glyph position font table by the server process;

filling the data structure with a list of glyph advance values, a list of x-placement values and a list of y-placement values by the server process; and using the list of glyph advance values, the list of x-placement values and the list of y-placement values by the client process to layout the run of text by the client process.

21. A method of communication between a client process and a server process, comprising the steps of:

a. selecting a run of text by the client process, the run of text comprising a plurality of characters;

b. issuing a feature call for a selected feature to the server process by the client process;

c. in response to the feature call, identifying characters of the run of text which support the selected feature by the server process by:

1. selecting one of the plurality of characters as a selected character;

2. accessing a font table to determine whether the selected character supports the selected function;

3. if the selected character supports the selected function, then identifying the selected character; and 4. repeating steps 1–3 with another one of the plurality of characters as the selected character; and d. receiving the identified characters by the client process.

22. The method of claim 21, wherein the step of receiving the identified characters by the client process comprises:

receiving a data structure containing a list of the identified characters created by the server process.

23. The method of claim 21, wherein the selected function is a swash function.

* * * * *

UNITED STATES PATENT AND TRADEMARK OFFICE
CERTIFICATE OF CORRECTION

| | | |
|---|---|---|
| PATENT NO. | : 6,288,726 B1 | Page 1 of 2 |
| APPLICATION NO. | : 08/884115 | |
| DATED | : September 11, 2001 | |
| INVENTOR(S) | : Dean D. Ballard | |

It is certified that error appears in the above-identified patent and that said Letters Patent is hereby corrected as shown below:

Column 13, line 21, cancel the text beginning with "11. A method for positioning" to and ending with "a glyph position font table." in column 13, line 32, and insert the following claim:

--11. A method for positioning a glyph in a run of text comprising the steps of:

a. establishing a base line for the run of text;

b. advancing a virtual pen point along the base line to a glyph position;

c. at the position of the virtual pen point adjusting an X-placement of the glyph; and d. at the position of the virtual pen point adjusting a Y-placement of the glyph, wherein the X-placement of the glyph and the Y-placement of the glyph are obtained by a layout services library from a glyph position font table.--

Column 13, line 33, "13." should be changed to --12.--.

Column 13, line 43, "14." should be changed to --13.--.

Column 13, line 58, "15. The method of claim 14," should be changed to --14. The method of claim 13,--.

Column 13, line 61, "16. The method of claim 14," should be changed to --15. The method of claim 13,--.

Column 14, line 1, "17." should be changed to --16.--.

Column 14, line 15, "18." should be changed to --17.--.

Column 14, line 26, "19. The method of claim 18," should be changed to --18. The method of claim 17,--.

Column 14, line 30, "20. The method of claim 18," should be changed to --19. The method of claim 17,--.

Signed and Sealed this
Ninth Day of August, 2011

David J. Kappos
*Director of the United States Patent and Trademark Office*

CERTIFICATE OF CORRECTION (continued)
U.S. Pat. No. 6,288,726 B1

Column 14, line 42, "21." should be changed to --20.--.

Column 14, line 60, "22. The method of claim 21," should be changed to --21. The method of claim 20,--.

Column 14, line 64, "23. The method of claim 21," should be changed to --22. The method of claim 20,--.